United States Patent

Ricaud et al.

[15] 3,702,099

[45] Nov. 7, 1972

[54] ELECTROMAGNETIC JUNCTION, INTER ALIA FOR AN OVERHEAD DUO-RAIL CONVEYOR

[72] Inventors: Pierre A. Ricaud, Chatou; Simon A. Cynober, Paris, both of France

[73] Assignee: Jeumont-Schneider, Paris, France

[22] Filed: Nov. 21, 1969

[21] Appl. No.: 878,758

[30] Foreign Application Priority Data

Nov. 22, 1968 France....................68174834

[52] U.S. Cl............................104/105, 104/148 LM
[51] Int. Cl. ..............................E01b 25/26
[58] Field of Search...104/88, 96, 105, 138, 148 LM; 310/11, 12

[56] References Cited

UNITED STATES PATENTS

| 3,167,168 | 1/1965 | Park | 198/31 |
| 2,404,984 | 7/1946 | Powers | 104/148 |
| 2,750,898 | 6/1956 | Hjortborg | 104/148 |
| 3,343,498 | 9/1967 | Klamp | 104/130 |

FOREIGN PATENTS OR APPLICATIONS 760,521  6/1967  Canada........................310/12

Primary Examiner—Gerald M. Forlenza
Assistant Examiner—D. W. Keen
Attorney—Raymond A. Robic

[57] ABSTRACT

An electromagnetic junction of use inter alia for an overhead duo-rail conveyor moving loads without transfer chain and moving blading, comprising: for each direction upstream and downstream of the junction, a stationary polyphase field system extending parallel to the rail of the particular junction branch concerned and energized by a polyphase a.c. supply; for each load to be carried and sent over the junction, an armature in the form of an electrically conductive plate secured to or forming part of the load; means for bringing each load as far as the junction entry and for removing the same at the junction exit, and a switching facility so devised as, when a load enters the junction, to energize simultaneously the junction upstream branch field and the field of that downstream branch of the junction to which the load is required to go.

8 Claims, 6 Drawing Figures

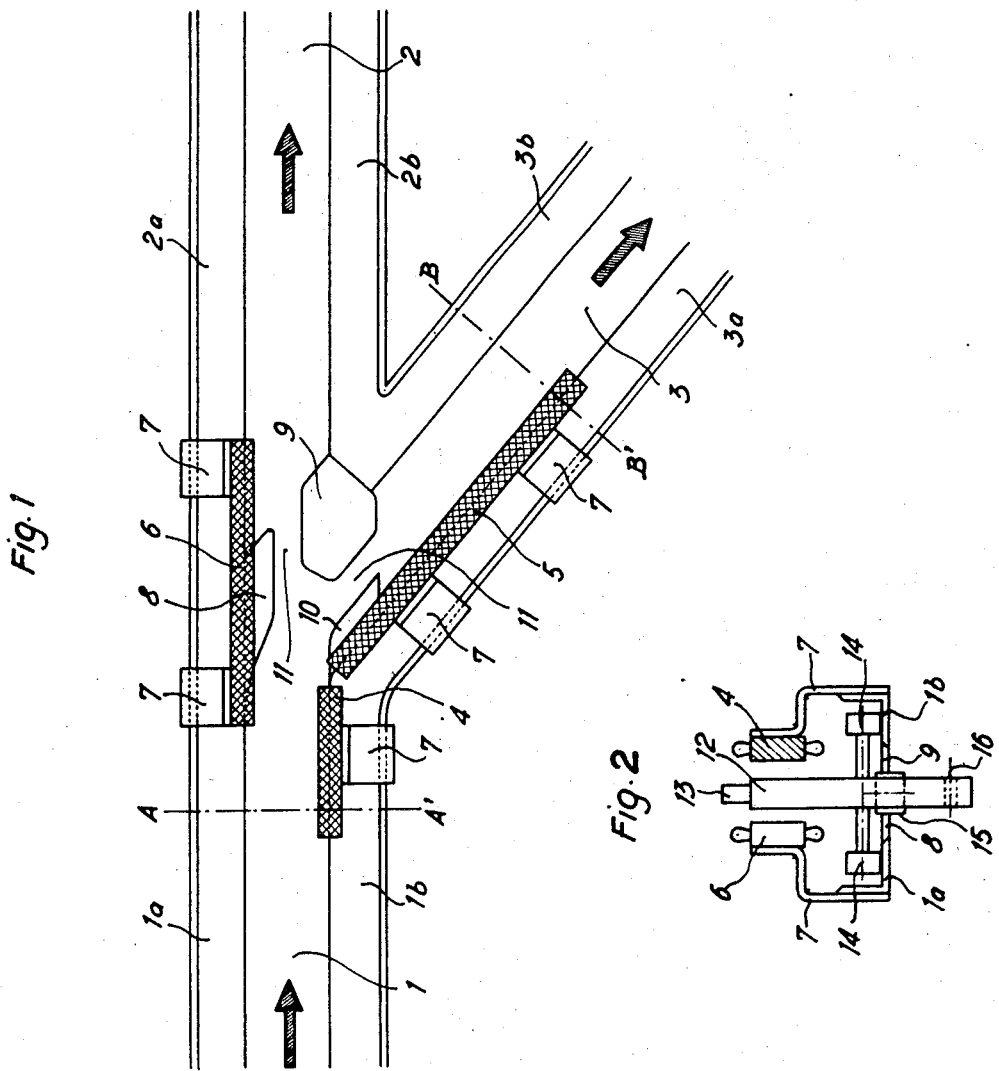

INVENTORS
Pierre A. RICAUD
Simon A. CYNOBER

BY

ATTORNEY

ELECTROMAGNETIC JUNCTION, INTER ALIA FOR AN OVERHEAD DUO-RAIL CONVEYOR

This invention relates to an electromagnetic junction, inter alia for an overhead duo-rail conveyor, which has no moving blading in the case of a facing junction and not requiring any auxiliary member, such as a transfer chain, to move a disengaged carriage over a facing or trailing junction.

Of course, facing junctions in overhead conveyors comprise moving blading which, as well as being delicate anyway because of the forces which it is required to withstand, needs some form of actuation for positioning it securely. The carriages of an overhead duo-rail conveyor are disengaged or declutched for entry into the junction, where they must be taken over by a transfer chain.

It is a first object of the invention to devise an electromagnetic junction devoid of moving blading.

It is a second object of the invention to drive the carriages while they are declutched as they pass over the junction, without the need to use a transfer chain.

A feature of the junction provided by the invention is a combination of stationary fields of linear induction motors, the driving force and the attractive force both being used.

In a first form of the invention, the fields are provided for the upstream and downstream junction branches, and this first embodiment of an electromagnetic junction according to the invention is characterized in that it comprises:

for each direction upstream and downstream of the junction, a stationary polyphase field system extending parallel to the rail of the particular junction branch concerned and energized by a polyphase a.c. supply;

for each load to be carried and sent over the junction, an armature in the form of an electrically conductive plate secured to or forming part of the load;

means for bringing the loads as far as the junction entry and for removing the loads at the junction exit, and a switching facility so devised as, when a load enters the junction, to energized simultaneously the junction upstream branch field and the field of that downstream branch of the junction to which the load is required to go, the fields of the other downstream branches being de-energized.

In a second embodiment, two independent field systems in a back-to-back arrangement are secured to each load, each such field coming opposite an armature secured to the corresponding outer rail of each junction branch, the other features remaining unchanged.

In a third embodiment, the loads or load-bearing carriages have neither an armature nor a field; inside the junction, however, there is at least one auxiliary carriage which is driven by means of the linear motor system hereinbefore outlined and which can make the outward movement and the return movement from the junction entry to the exit of another branch of the junction and which, through the agency of a finger, can move the load or load-bearing carriage over the junction.

The electromagnetic junction of this third embodiment comprises:

for each direction upstream and downstream of the junction, a stationary polyphase field system extending parallel to the rail of the particular junction branch concerned and energized by a polyphase a.c. supply;

for at least one downstream direction of the junction, an auxiliary carriage whose travel is limited to the junction zone and which has secured to it an electrically conductive plate serving as the armature of one of the aforesaid field systems and enabling the auxiliary carriage to be driven, the same having a finger for pushing load-bearing carriages into the junction zone;

means for bringing the loads as far as the junction entry and for removing them at the junction exit;

a switching facility so devised as, when a load-bearing carriage arrives at the junction entry and an auxiliary carriage has previously been placed there, to energized simultaneously the field of the upstream branch and the field of that downstream branch of the junction to which the load is required to go—the fields of the other downstream branches being de-energised—so as to move the auxiliary carriage and the load-bearing carriage simultaneously in the selected direction as far as the junction exit and, by reversing the direction of rotation of the phases in the aforesaid fields, to return the auxiliary carriage to the junction entry once such carriage has disengaged from the load-bearing carriage.

In a variant of the third embodiment, the auxiliary carriage does not return to the junction entry on the same path by reversal of the direction of rotation of the phases in the fields, but instead the auxiliary carriage returns to the junction entry by continuing its movement along a loop outside the junction through the agency of extra field systems which are disposed along the loop and which are energized by means of the switching facility.

In another embodiment, the electrically conductive armature can be one of the walls of the auxiliary carriage.

Throughout the foregoing description, each polyphase field system can be replaced by an armature and each armature can be replaced by a polyphase field system.

The invention will be more readily understood from the following description and accompanying drawings wherein:

FIG. 1 is a plan view of the bottom rails of a duo-rail conveyor comprising a junction;

FIG. 2 is a cross-section on the line A—A' of FIG. 1;

Figure 3:
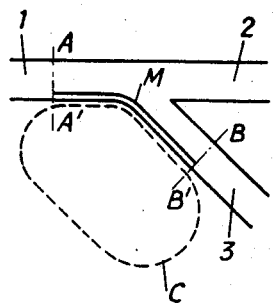
FIG. 3 is a diagrammatic plan view of the junction with a diagrammatic illustration of two variants using an auxiliary transfer carriage.

The bottom rails visible in FIG 1 bound a main upstream conveyor 1, a main downstream conveyor 2, and a secondary or minor conveyor 3; the conveyors are embodied by rails 1a, 1b and 2a, 2b and 3a, 3b respectively which form ways or tracks or the like. Carriages required to pass over the junction are disengaged from conveyor 1 at line A—A' and engaged with conveyor 3 at line B—B'. A field 4 is provided on conveyor 1 and the upstream end of field 4 is disposed on the upstream side of line A—A'. A second or diverting field 5 is provided on conveyor 3; the downstream end of field 5 is disposed on the downstream side of line B—B'. A third field 6 is provided at the junction on the rail 1a 2a, the arrangement being such that there is a slight overlap between the action of the third field 6 and the action of the first field 4. The various fields are secured to support members 7 which are secured to the rails 1a 2a and 1b 3a. Track continuity in the junction is by means of ordinary flat metal members which are secured to the rails e.g. by welding. The metal member 8 and the metal member 9 make the outer rail 1a 3b continuous and the metal members 9, 10 make the inner rail 1b 2b continuous. The bottom bearing part of a carriage travelling along the conveyor 1, 2 or 1, 3 can pass through gaps 11 left between member 8 and member 9 and between member 9 and member 10.

The cross-sectional view view in FIG. 2 shows the body of the carriage 12 forming the armature associated with the field 4, the latter being shown with its winding ends. Carriage 12 has abutments 13 adapted to co-operate with fingers of the chain (not shown), running rollers 14, a centring roller 15 of slightly smaller diameter than the gap 11, and a aperture 16 adapted to receive a load hook.

In automatic conveyors of this kind, carriage destination is always stored and the store, whether in distributed or lumped form, always comes into operation when a carriage requiring to pass from the main conveyor to the secondary or minor conveyor arrives at the line A—A'. It will first be assumed that the carriage has been selected to pass to conveyor 2. The carriage is therefore not disengaged from the chain and continues to be driven thereby. The field 6 is therefore not essential and can remain de-energized, although if energized it will help, in the event of accidental disengagement, to move the carriage along conveyor 2 and thus enable conveyor 3 to continue in operation.

It will now be assumed that the carriage has been selected to pass to conveyor 3. The carriage is therefore disengaged or released from the chain of conveyor 1 immediately it reaches the line A—A' but is then taken over by the diverting field 4; the latter, as well as driving the carriage, engages the same firmly with rail 1b, with the result that the carriage can move on to conveyor 3 as soon as the carriage rollers 14 have a chance to do so.

When the front of the carriage passes beyond the field 4 it enters the zone of influence of the field 5 which cooperates with the field 4 to complete the change of carriage direction. The field 5 also provides an attractive force and a driving force for the carriage. The field 5 is long enough to drive the carriage as far as the line B—B', at which place the carriage engages with the chain of conveyor 3. The field 5 therefore obviates the need for a transfer chain, for in the junction according to the invention a declutched carriage is always driven by the action of fields on an armature borne or formed by the carriage.

Identical considerations apply to a trailing junction, which has no blading anyway. Of course, the direction of rotation of the phases in the fields must be the reverse of the previous case, since the carriage is moving from either the conveyor 3 or the conveyor 3 on to the conveyor 1. A carriage passing from conveyor 2 to conveyor 1 is driven all the time, as is the case for a carriage going from conveyor 1 to conveyor 2. However, a carriage going from conveyor 3 on to conveyor 1 is disengaged at the line B—B' and re-engaged at the line A—A', the fields 4, 5 taking the place of a transfer chain.

Referring to FIG. 3, there can be seen a main upstream conveyor 1, a main downstream conveyor 2, a line A—A' at which load-bearing carriages required to pass to the secondary conveyor 3 are disengaged, and the line B—B' at which such carriages are engaged with the secondary or minor conveyor 3. The term "junction zone" will be used herein to denote that part of the junction which is disposed between lines as A—A' and B—B'. Two alternative paths for the auxiliary carriage in the junction zone are shown; the solid-line path M is for a reciprocating auxiliary carriage and the chain-line path C is for an auxiliary carriage moving around a closed loop.

Figure 4:
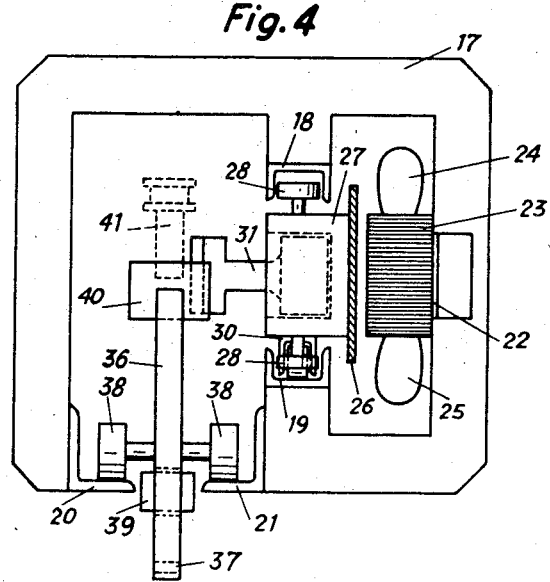
FIG. 4 is a cross-sectional view showing the auxiliary carriage and the load-bearing carriage for use in FIG. 3, and FIGS. 5 and 6 are two more views of the auxiliary carriage shown in FIG. 4.
Figure 5:
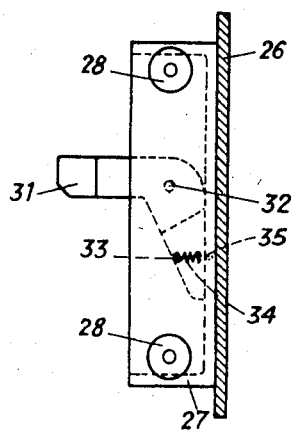
Figure 6:
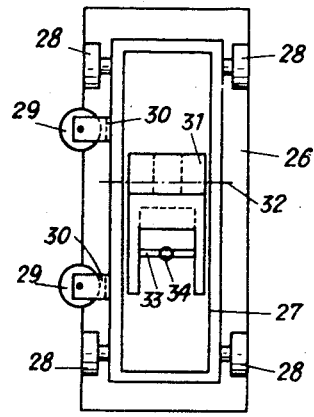

Referring to FIG. 4, a stirrup-shaped member 17 bears in predetermined spaced relationship to one another a number of metal U-members 18, 19 and angle-members 20, 21. Through the agency of an angle-member 22 secured to the stirrup 17, the same bears a linear induction motor field system 23 whose winding ends are represented in diagrammatic form by loops 24, 25. The linear motor has an armature 26 in the form of an electrically conductive plate rigidly secured to an auxiliary carriage 27 guided in the members 18, 19 by four rollers 28 and borne at the bottom by the member 19 with the interposition of two rollers 29 whose support members 30 are secured to carriage 27. A finger 31 mounted in the frame of carriage 27 for pivoting around a pivot pin 32 is biased by a tension spring 34 having one end secured to a rod 33 on finger 31 and the other end secured to a pin or stud 35 secured in the end plate of carriage 27. Spring 34 serves to return the finger 31 into the position shown in FIGS. 5 and 6 while the auxiliary carriage is returning empty.

The load-bearing carriage takes the form of a member 36 to which the load support hook (not shown in FIG. 4) is secured, such hook extending through aperture 37. The load-bearing carriage runs on the angle-members 20, 21 by means of rollers 38 and is guided between the members 20 and 21 by means of a centring roller 39 having a vertical axis of rotation. The load-bearing carriage has abutments 40 adapted to cooperate with the finger 31 and with a finger 41 on the handling chain.

When a load-bearing carriage required to go e.g. to conveyor 3 reaches the line A—A' on the main upstream conveyor 1, the abutment 41 on the chain is disengaged, whereafter, through the agency of a switching facility (not shown in FIGS. 4–6), the field of the upstream branch 1 and the field of that downstream branch 3 to which the load is required to go can be energized simultaneously, the field of the other branch 2 being de-energized; thereafter the auxiliary carriage 27, which has been placed beforehand at the junction entry line A—A', acts by way of the finger 31 to move the load-bearing carriage as far as the junction exit line B—B'; when the finger 31 has disengaged from the abutment 40 and the chain finger 41 is driving the load-bearing a carriage, the switching facility reverses the direction of rotation of the phases in the fields of the branches 1 and 3 to return the auxiliary carriage 27 to the junction entry A—A'. The auxiliary carriage therefore performs the same function as a transfer chain.

Features other than those hereinbefore described can be considered which fall under this invention. For instance, the fields 4, 5 can be wound on a single curved magnetic circuit, as is the custom in rotating induction motors, or even on a magnetic circuit comprising a curved part between two straight parts, and have only a single polyphase winding. The invention is also of use for a flux of particles in bulk so as to produce a deflection of the metal particles forming an armature, to separate the particles.

An extra field can be placed athwart the junction, e.g. above or below the meeting place of the various branches, so that it can act on a corresponding armature plate borne either by the load or its carriage to deflect the front of the carriage in the required direction.

We claim:

1. An electromagnetic junction for an overhead duo-rail conveyor moving loads without transfer chain and moving blades, comprising:
   a. for each direction upstream and downstream of the junction, a stationary polyphase field system extending parallel to the rail of the particular junction branch concerned and adapted to be energized by a polyphase a.c. supply;
   b. for each load to be carried and sent over the junction, an armature in the form of an electrically conductive plate secured to or forming part of the load;
   c. means for bringing each load as far as the junction entry and for removing the same at the junction exit; and
   d. switching means adapted, when a load enters the junction to simultaneously connect the junction upstream branch field and the field of that downstream branch of the junction to which the load is required to go to said a.c. supply to move the armature in the selected direction.

2. An electromagnetic junction for an overhead duo-rail conveyor moving loads without transfer chain and moving blades, comprising:
   a. two armature systems in the form of electrically conductive plates secured along each rail of the upstream and downstream branches of the junction;
   b. a moving polyphase double field system for each load to be carried and sent over a junction, such system moving the load and comprising two parallel halves disposed in back-to-back relationship and adapted to be independently energized by a polyphase a.c. supply, each such half serving as the field of one of the aforesaid two armature systems;
   c. means for bringing each load to be sent over the junction as far as the junction entry and for removing the same at the junction exit; and
   d. switching means adapted when a load enters the junction, to connect the field half which is disposed on the side where the load is required to go to said a.c. supply, the other field half being deenergized, to move the load in the selected direction.

3. An electromagnetic junction as set forth in claim 1, comprising, at the meeting place of the various branches, an extra field system disposed transversely of the downstream branch fields and having a corresponding armature disposed on the load or formed by a conductive part thereof, and serving to divert the load in the required direction.

4. An electromagnetic junction for an overhead duo-rail conveyor for moving loads without transfer chain and moving blades, comprising:
   a. for each direction upstream and downstream of the junction, a stationary polyphase field system extending parallel to the rail of the particular junction branch concerned and adapted to be energized by a polyphase a.c. supply;
   b. for at least one downstream direction of the junction, an auxiliary carriage whose travel is limited to the junction zone and which has secured to it an electrically conductive plate serving as the armature of one of the aforesaid field systems and enabling the auxiliary carriage to be driven, the same having a finger for pushing load-bearing carriages into the junction zone;
   c. means for bringing each load as far as the junction entry and for removing the same at the junction exit;
   d. switching means adapted, when a load-bearing carriage arrives at the junction entry and an auxiliary carriage has previously been placed there, to simultaneously connect the field of the upstream branch and the field of that downstream branch of the junction to which the load is required to go to said a.c. supply so as to move the auxiliary carriage and the load-bearing carriage simultaneously in the selected direction as far as the junction exit and to return the auxiliary carriage to the junction entry once such carriage has disengaged from the load-bearing carriage.

5. An electromagnetic junction as set forth in claim 4, wherein the auxiliary carriage is returned to the junction entry on the same path by reversing the direction of rotation of the phases in said fields.

6. An electromagnetic junction as set forth in claim 4, wherein the auxiliary carriage returns to the junction entry by continuing its movement along a loop outside the junction through the agency of extra field systems which are disposed along the loop and which are energized by means of the switching facility.

7. An electromagnetic junction as set forth in claim 4, wherein the electrically conductive armature plate is one of the walls of the auxiliary carriage.

8. An electromagnetic junction as set forth in claim 4, wherein each polyphase field system is replaced by an armature and each armature is replaced by a polyphase field system.

* * * * *